(12) United States Patent
Creviston

(10) Patent No.: US 8,978,395 B2
(45) Date of Patent: Mar. 17, 2015

(54) REJECT HEAT DRIVEN ABSORPTION COOLING CYCLE

(75) Inventor: Alex Creviston, Muncie, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 592 days.

(21) Appl. No.: 12/858,867

(22) Filed: Aug. 18, 2010

(65) Prior Publication Data

US 2012/0042665 A1    Feb. 23, 2012

(51) Int. Cl.
*F25B 7/00* (2006.01)
*F25D 17/06* (2006.01)
*F25B 17/00* (2006.01)
*F25B 27/00* (2006.01)
*F25D 23/12* (2006.01)
*F25D 23/00* (2006.01)
*F25B 27/02* (2006.01)
*B60H 1/00* (2006.01)

(52) U.S. Cl.
CPC ............ *F25B 27/02* (2013.01); *B60H 1/00271* (2013.01); *B60L 2240/425* (2013.01); *Y02T 10/642* (2013.01)
USPC .................. 62/79; 62/259.2; 62/232; 62/271; 62/236; 62/94

(58) Field of Classification Search
CPC ........ F25B 15/00; F25B 15/006; F25B 27/02; B60H 1/3201; Y02B 30/62
USPC ............. 62/79, 64, 259.2, 232, 271, 236, 241
See application file for complete search history.

(56) References Cited

U.S. PATENT DOCUMENTS

| | | | | |
|---|---|---|---|---|
| 4,307,575 | A * | 12/1981 | Popinski | 62/148 |
| 8,316,659 | B2 * | 11/2012 | Bouysset et al. | 62/238.3 |
| 2003/0127528 | A1 | 7/2003 | Sabhapathy et al. | |
| 2004/0163861 | A1 | 8/2004 | Fukuda et al. | |
| 2005/0016193 | A1 * | 1/2005 | Tarasinski et al. | 62/238.3 |
| 2006/0130469 | A1 * | 6/2006 | Baeuerle et al. | 60/300 |
| 2007/0181356 | A1 * | 8/2007 | Ando et al. | 180/65.4 |

FOREIGN PATENT DOCUMENTS

| | | | |
|---|---|---|---|
| GB | 2466081 A | * | 6/2010 |
| JP | 2006321389 | | 11/2006 |

OTHER PUBLICATIONS

Notification of Transmittal of the International Search Report and the Written Opinion of the International Searching Authority, or the Declaration; PCT/US2011/048216; Mar. 9, 2012.

* cited by examiner

*Primary Examiner* — Judy Swann
*Assistant Examiner* — Zachary R Anderegg
(74) *Attorney, Agent, or Firm* — Cantor Colburn LLP

(57) ABSTRACT

An electric machine system includes: an electric motor; and an absorption cooling system driven by heat generated by the electric motor and configured to cool a primary cooling fluid that removes the heat from the electric motor to a temperature below an ambient temperature of an ultimate heat sink. A method for operating the electric machine system is also disclosed.

16 Claims, 4 Drawing Sheets

REJECT HEAT DRIVEN ABSORPTION COOLING CYCLE

BACKGROUND

Exemplary embodiments pertain to the art of electric machines and, more particularly, to electric machine systems having improved cooling.

Electric vehicles (EVs) or hybrid electric vehicles (HEVs) are gaining in popularity as fuel prices increase and consumers have greater awareness of environmental impacts caused by traditional vehicles. Both EVs and HEVs use a traction motor powered by electricity for propulsion to reduce emissions.

High power traction motors and the electronics, such as inverters, that provide electrical power and control can generate significant amounts of heat. The heat needs to be removed in order for the motors and electronics to perform efficiently and reliably. With efficiency and reliability being ever more important to encourage the public's use of EV's and HEV's so as to reduce emissions and improve air quality, improved cooling schemes having a positive effect on electrical performance and longevity would be well received by the art.

BRIEF DESCRIPTION

Disclosed is an electric machine system including: an electric motor; and an absorption cooling system driven by heat generated by the electric motor and configured to cool a primary cooling fluid that removes the heat from the electric motor to a temperature below an ambient temperature of an ultimate heat sink.

Also disclosed is an electric machine system including: an electric motor; an inverter configured to operate the electric motor; and an absorption cooling system driven by heat generated by the electric motor or the inverter and configured to cool a primary cooling fluid that removes the heat from the electric motor or the inverter to a temperature below an ambient temperature of an ultimate heat sink.

Further disclosed is A method of operating an electric machine system having an electric motor, the method includes: removing heat from the electric motor; heating a working fluid in an absorption cooling system with the removed heat to drive the absorption cooling system; cooling a cooling fluid to below a temperature of an ultimate heat sink using the absorption cooling system; and cooling the electric motor using the cooled cooling fluid.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
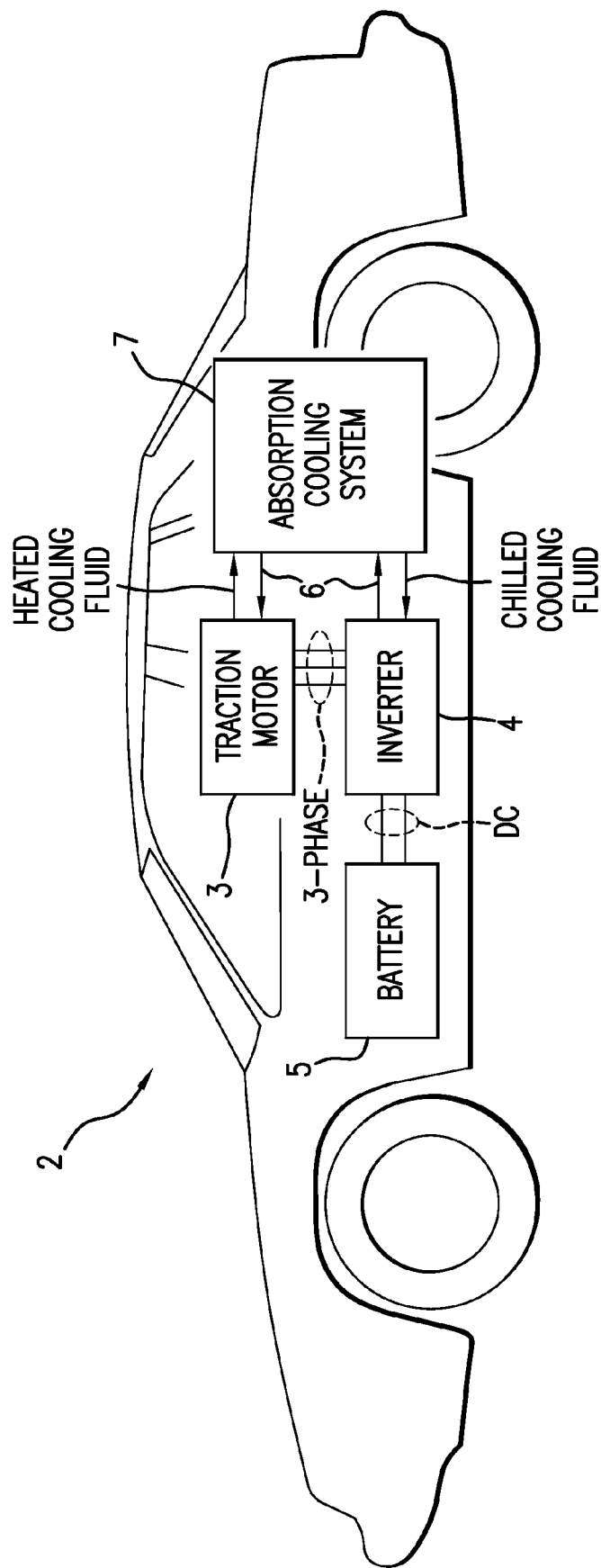
FIG. 1 illustrates an exemplary embodiment of an electric machine system having an electric motor and a heat driven absorption cooling system.

An electric machine system in accordance with an exemplary embodiment is indicated generally at 2 in FIG. 1. In the embodiment of FIG. 1, the electric machine system 2 is a vehicle such as an EV or an HEV. The electric machine system 2 includes an electric machine, shown in the form of a fraction motor or electric motor 3. For dynamic braking purposes, the electric motor 3 may also be used in an electrical generator mode. The electric motor 3 is powered by an inverter 4, such as a variable speed motor drive, which varies motor speed by varying an output frequency. The inverter 4 receives electric power from a direct current (DC) source such as a battery 5. Components requiring heat removal, such as the electric motor 3 and the inverter 4, are cooled by a primary cooling fluid 6 that is in turn cooled or chilled by a heat driven absorption cooling system referred to herein as the absorption cooling system 7.

In conventional cooling systems, a liquid is used to remove heat from heat-generating components. The heat is then removed from the liquid generally using a liquid-to-air heat exchanger such as a radiator with ambient air being the ultimate heat sink. One component of cooling system efficiency is the temperature difference, delta T, between the liquid and the air (i.e., between the hot and cold sides of the heat exchanger). The temperature of the cold side of the radiator is generally ambient air temperature. In contrast to the conventional cooling systems, the absorption cooling system 6 uses waste heat from heat-generating components to drive an absorption cooling cycle to lower the temperature of a secondary cooling fluid to below ambient air temperature, thereby increasing delta T. By increasing delta T, the cooling efficiency is increased with the resulting increase in electrical performance and longevity of heat-generating components. Because waste heat is used to drive the absorption cooling system 7, the benefits of increased cooling efficiency are derived without a corresponding decrease in the energy efficiency of the electric machine system 2.

In one embodiment of the absorption cooling system 7, a working fluid (i.e., refrigerant) having a low boiling point, generally less than 0 degrees F., is used in an absorption cooling cycle (also known as absorption refrigeration cycle). Ammonia, having a boiling point of −28 degrees F., is one non-limiting example of the working fluid. Using ammonia as an example, liquid ammonia is mixed with a hydrogen gas. When mixed with the hydrogen gas, the liquid ammonia evaporates absorbing heat to provide the cooling. The gaseous ammonia is then mixed with water, which absorbs the ammonia. The water-ammonia solution is then heated using the waste heat to boil ammonia gas out of the solution. Next, the ammonia gas is condensed back to a liquid and sent to be mixed with the hydrogen gas to complete the absorption cooling cycle.

Various types of absorption cooling cycles may be used in the absorption cooling system 7. These absorption cooling cycles are used extensively in cogeneration systems to provide cooling to industrial processes or to provide cooling during summer months to buildings. As the various types of absorption cooling cycles and the associated thermodynamics are well known in the art, they are not discussed in any further detail herein.

Figure 2:
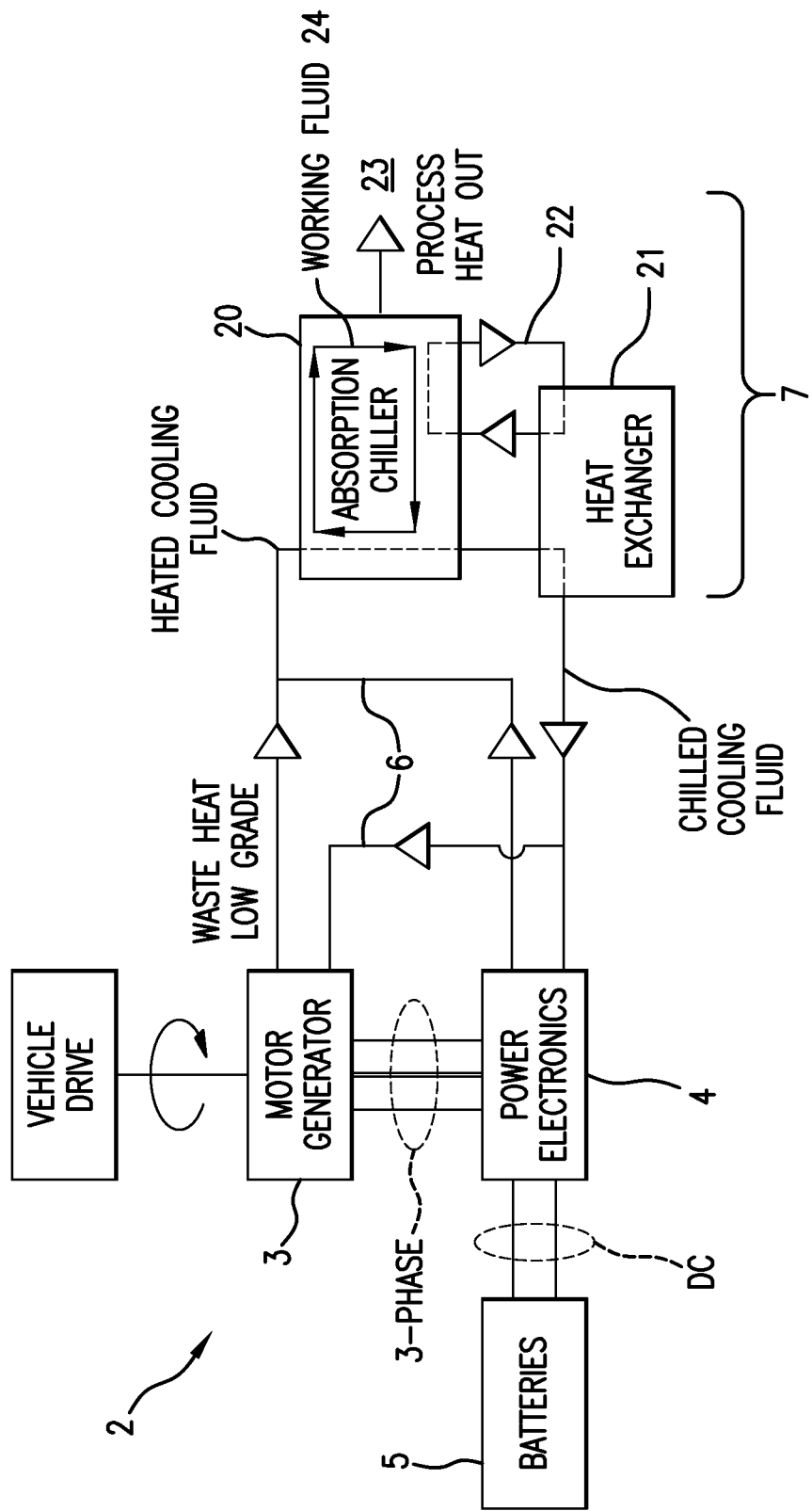
FIG. 2 depicts aspects of the heat driven absorption cooling system disposed in an EV.

Reference may now be had to FIG. 2 depicting aspects of the electric machine system 2 in an embodiment of an EV. In the embodiment of FIG. 2, the absorption cooling system 7 includes an absorption chiller 20 and a heat exchanger 21. Low-grade waste heat from the electric motor 3 and the inverter 4 is provided to the absorption chiller 20 by the primary cooling fluid 6, which circulates through the electric motor 3 and the inverter 4. The term "low-grade" relates to the waste heat having a temperature that is less than an exhaust temperature of an internal combustion engine. The low-grade waste heat is used by the absorption chiller 20 to heat a working fluid 24 in an absorption cooling cycle used by the absorption chiller 20. Heating the working fluid drives the absorption cooling cycle to chill a secondary cooling fluid 22 to a temperature below a temperature of an ultimate heat sink 23. In the embodiment of FIG. 2, the ultimate heat sink 23 is ambient air.

The secondary cooling fluid 22 that is in a chilled state is circulated through a cold side of the heat exchanger 21. The primary cooling fluid 6 that exits the absorption chiller 20 is circulated through a hot side of the heat exchanger 21. In the heat exchanger 21, the primary cooling fluid 6 is cooled by the chilled secondary cooling fluid 21 to a temperature below the temperature of the ultimate heat sink. Thus, the primary cooling fluid 6 exiting the heat exchanger 21 will result in the delta T being greater than the delta T that would result if the temperature of the primary cooling fluid 6 was at or about the temperature of the ultimate heat sink 23.

Figure 3:
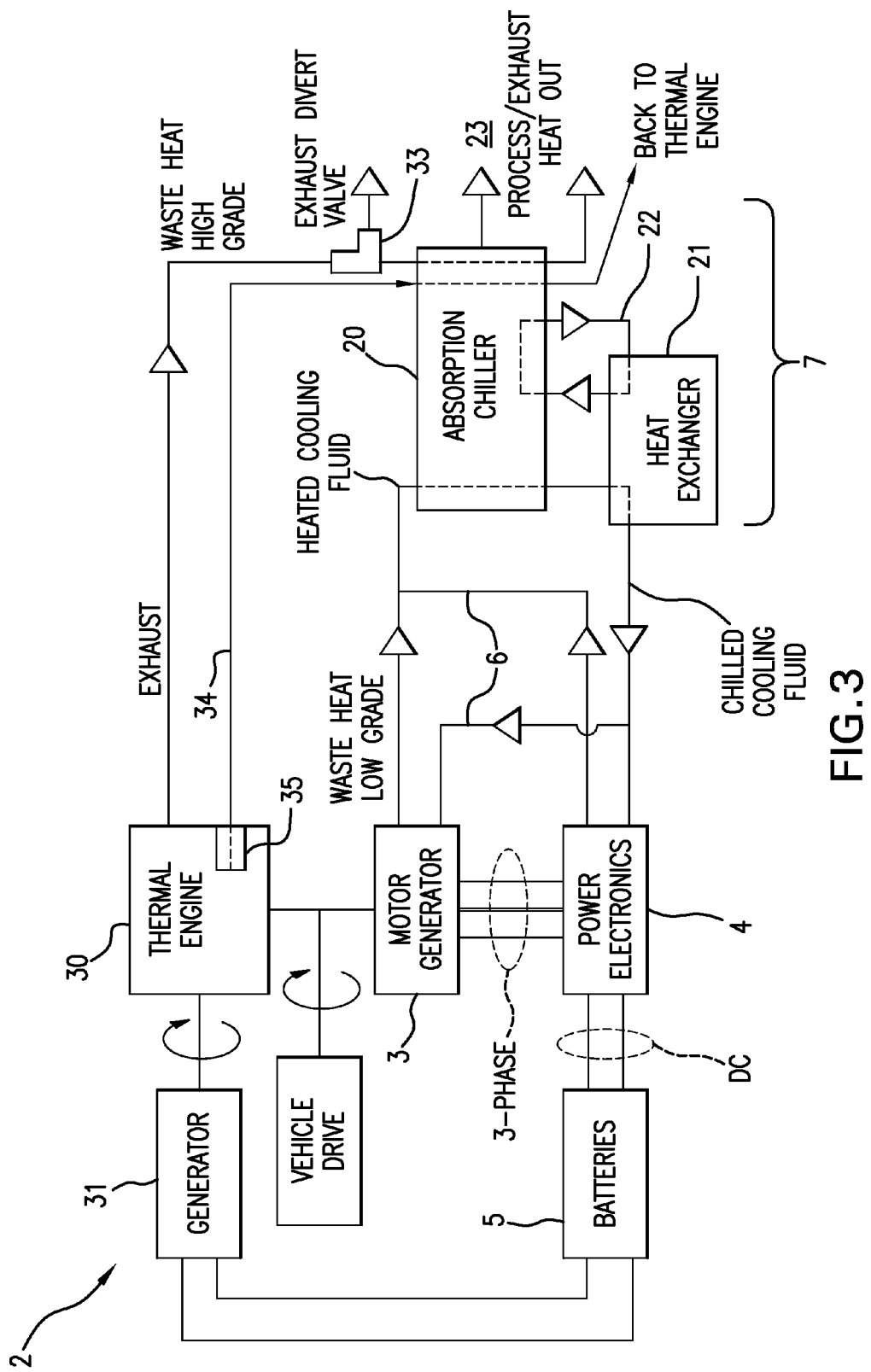
FIG. 3 depicts aspects the heat driven absorption cooling system disposed in an HEV.

Reference may now be had to FIG. 3 depicting aspects of the electric machine system 2 in an embodiment of an HEV. In the embodiment of FIG. 3, the electric machine system 2 includes an internal combustion engine 30 coupled to an electrical generator 31. The engine 30 is configured to turn the electrical generator 31, which charges the battery 5, or to mechanically power the HEV.

The absorption cooling system 7 in FIG. 3 works as described with respect to FIG. 2. In addition, the absorption cooling system 7 receives high-grade waste heat from exhaust emitted by the engine 30. The high-grade heat, as with the low-grade heat, is used by the absorption chiller 20 to heat a working fluid in an absorption cooling cycle used by the absorption chiller 20. Heating the working fluid drives the absorption cooling cycle to chill the secondary fluid 22 to a temperature below a temperature of an ultimate heat sink 23. In order to prevent the absorption chiller 20 from being overheated and damaged by too much exhaust heat, an exhaust diverter valve 33 is disposed upstream of the exhaust entering the absorption chiller 20. The exhaust diverter valve 33 may be fixed, manually adjusted, or automatically adjusted using a temperature sensor and a controller (both not shown).

In addition to or in lieu of using the engine exhaust to provide heat, an engine cooling fluid 34 that is circulated through the engine 30 may be used to heat the working fluid in the absorption chiller 20. The engine cooling fluid 34, for example, may be circulated through a cooling jacket 35 of the engine 30.

It can be appreciated that the various flow paths of the various cooling fluids shown in FIGS. 2 and 3 can be modified without departing from the spirit of the invention. For example, flow paths maybe selected depending on limitations related to maximum temperatures and efficiency achieved in tuning the various heat transfer loops.

Figure 4:
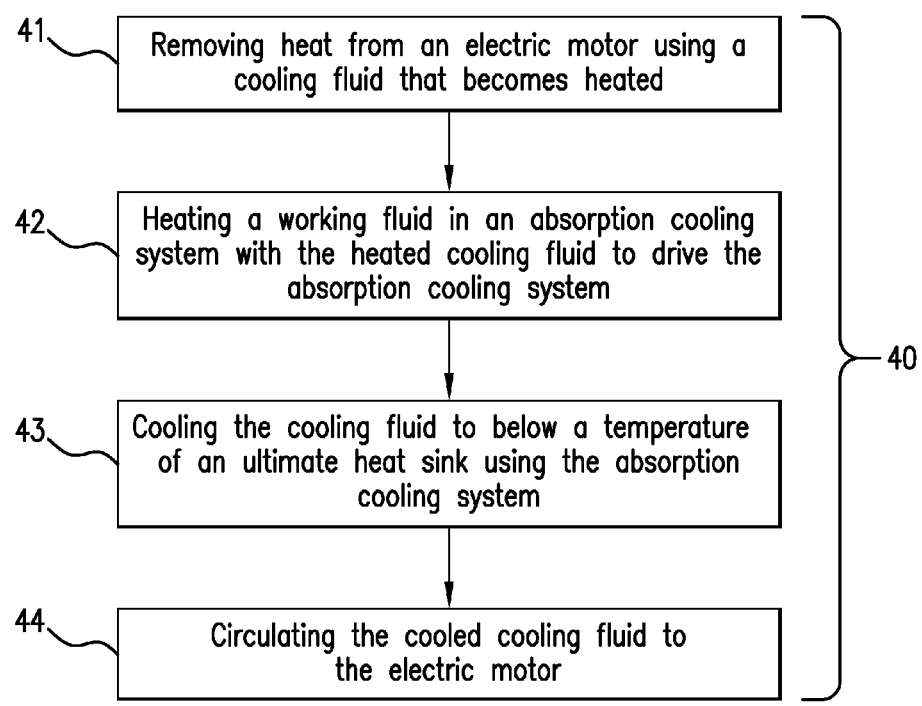
FIG. 4 presents one example of a method for operating an electric machine system having the heat driven absorption cooling system.

FIG. 4 presents one example of a method 40 for operating the electric machine system 2. The method 40 calls for (step 41) removing heat from an electric motor using a cooling fluid that becomes heated. Further, the method 40 calls for (step 42) heating a working fluid in the absorption cooling system with the heated cooling fluid to drive the absorption cooling system. The term "drive" relates to providing heat that is used to power the absorption cooling system. Further, the method 40 calls for (step 43) cooling the cooling fluid to below a temperature of an ultimate heat sink using the absorption cooling system. Further, the method 40 calls for (step 44) circulating the cooled cooling fluid to the electric motor.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "couple" relates to one component being coupled either directly to another component or indirectly to the another component via one or more intermediate components.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine system comprising:
   an electric motor;
   a primary cooling fluid in thermal communication with the electric motor;
   an absorption cooling system driven by heat generated by the electric motor and configured to cool the primary cooling fluid that removes the heat from the electric motor to a temperature below an ambient temperature of a heat sink that receives heat from the absorption cooling system, the absorption cooling system having a refrigerant that is separate from and not mixing with the primary cooling fluid;
   wherein the absorption cooling system is configured to receive the primary cooling fluid to heat the refrigerant to drive the absorption cooling system; and
   wherein the absorption cooling system comprises an absorption chiller and a heat exchanger, wherein (i) the primary cooling fluid flows through the absorption chiller to heat the refrigerant in order to chill a secondary cooling fluid that is separate from and not mixing with the primary cooling fluid using an absorption cooling cycle and (ii) the primary cooling fluid after exiting the absorption chiller flows through the heat exchanger where the primary cooling fluid is cooled by the chilled secondary cooling fluid.

2. An electric machine system comprising:
   an electric motor;
   an inverter configured to operate the electric motor;
   a primary cooling fluid in thermal communication with the electric motor;
   an absorption cooling system driven by heat generated by the electric motor or the inverter and configured to cool the primary cooling fluid that removes the heat from the electric motor or the inverter to a temperature below an ambient temperature of a heat sink that receives heat from the absorption cooling system, the absorption cooling system having a refrigerant that is separate from and not mixing with the primary cooling fluid;

wherein the absorption cooling system is configured to receive the primary cooling fluid to heat the refrigerant to drive the absorption cooling system; and wherein the absorption cooling system comprises an absorption chiller and a heat exchanger, wherein (i) the primary cooling fluid flows through the absorption chiller to heat the refrigerant in order to chill a secondary cooling fluid that is separate from and not mixing with the primary cooling fluid using an absorption cooling cycle and (ii) the primary cooling fluid after exiting the absorption chiller flows through the heat exchanger where the primary cooling fluid is cooled by the chilled secondary cooling fluid.

3. A method of operating an electric machine system comprising an electric motor, the method comprising:

removing heat from the electric motor using a primary cooling fluid in thermal communication with the electric motor;

heating a working fluid that is separate from and not mixing with the primary cooling fluid in an absorption cooling system with the removed heat to drive the absorption cooling system;

cooling the primary cooling fluid using the absorption cooling system to below a temperature of a heat sink that receives heat from the absorption cooling system; and cooling the electric motor using the cooled primary cooling fluid wherein the absorption cooling system comprises an absorption chiller and a heat exchanger, wherein (i) the primary cooling fluid flows through the absorption chiller to heat the working fluid in order to chill a secondary cooling fluid that is separate from and not mixing with the primary cooling fluid using an absorption cooling cycle and (ii) the primary cooling fluid after exiting the absorption chiller flows through the heat exchanger where the primary cooling fluid is cooled by the chilled secondary cooling fluid.

4. The electric machine system according to claim 1, wherein the heat sink is ambient air.

5. The electric machine system according to claim 1, further comprising an inverter configured to operate the electric motor wherein heat generated by the inverter is used to drive the absorption cooling system and the primary cooling fluid removes the heat generated by the inverter.

6. The electric machine system according to claim 1, further comprising an internal combustion engine configured to turn an electrical generator to generate power to be supplied to the electric motor wherein the absorption cooling system is configured to receive heat generated by the engine in order to drive the absorption cooling system.

7. The electric machine system according to claim 6, wherein the absorption cooling system is configured to receive exhaust heat from the engine in order to drive the absorption cooling system.

8. The electric machine system according to claim 7, further comprising an exhaust diverter valve configured to divert a portion of the exhaust heat before the portion enters the absorption cooling system.

9. The electric machine system according to claim 6, wherein the
primary cooling fluid is circulated through the engine and heat from the engine is used to drive the absorption cooling system.

10. The electric machine system according to claim 6, further comprising an engine cooling fluid that is circulated through the engine and the absorption cooling system and is used to convey engine heat to drive the absorption cooling system.

11. The electric machine system according to claim 1, wherein the electric motor is configured to propel a vehicle.

12. The method of operating an electric machine system according to claim 3, further comprising cooling an inverter with the cooled primary cooling fluid, the inverter being configured to operate the electric motor.

13. The method of operating an electric machine system according to claim 3, further comprising removing heat from an internal combustion engine configured to turn an electrical generator to generate power to be supplied to the electric motor and using the engine heat to heat the working fluid to drive the absorption cooling system.

14. The method of operating an electric machine system according to claim 3, further comprising directing exhaust from the engine to the absorption cooling system in order to remove heat from the engine and to heat the working fluid to drive the absorption cooling system.

15. The method of operating an electric machine system according to claim 14, further comprising diverting a portion of the exhaust away from the absorption cooling system to avoid overheating of the absorption cooling system.

16. The method of operating an electric machine system according to claim 13, further comprising circulating an engine cooling fluid through the engine and using heat absorbed by the engine cooling fluid to heat the working fluid to drive the absorption cooling system.

* * * * *